(12) United States Patent
Priest (10) Patent No.: US 10,489,796 B2
(45) Date of Patent: Nov. 26, 2019

(54) SYSTEMS AND METHODS FOR AUTOMATED AUTHORING, DISTRIBUTING AND PROCESSING OF ENHANCED DISCRETE COUPONS

(75) Inventor: Travis L. Priest, Durango, CO (US)

(73) Assignee: Worldpay, LLC, Symmes Township, OH (US)

( * ) Notice: Subject to any disclaimer, the term of this patent is extended or adjusted under 35 U.S.C. 154(b) by 248 days.

(21) Appl. No.: 13/561,034

(22) Filed: Jul. 28, 2012

(65) Prior Publication Data
US 2013/0117090 A1    May 9, 2013

Related U.S. Application Data (60) Provisional application No. 61/557,437, filed on Nov. 9, 2011.

(51) Int. Cl.
*G06Q 30/02* (2012.01)

(52) U.S. Cl.
CPC .................... *G06Q 30/02* (2013.01)

(58) Field of Classification Search
CPC ............... G06Q 30/02; G06Q 30/0238; G06Q 30/0207; G06Q 30/0269; G06Q 30/387; G06Q 30/0225; G06Q 30/0255; G06Q 30/0242; G06Q 30/0215; G06Q 30/0233; G06Q 30/0251; G06Q 30/0224; G06Q 30/0236; G06Q 30/0253; G06Q 30/0276; G06Q 30/0239; G06Q 20/3674; G06Q 20/20; G06Q 20/387; G06Q 20/401
USPC .... 705/14, 14.23, 14.66, 14.26, 14.49, 14.1, 705/14.25, 14.38, 14.39, 14.53, 14.54, 705/14.55, 14.51, 14.52, 14.72, 16
See application file for complete search history.

(56) References Cited

U.S. PATENT DOCUMENTS

| 5,999,914 | A  | * | 12/1999 | Blinn ..................... G06Q 30/02 705/14.1 |
| 7,124,092 | B2 |   | 10/2006 | O'Toole, Jr. et al. |
| 7,877,289 | B1 | * | 1/2011  | Cunningham et al. .... 705/14.26 |

(Continued)

FOREIGN PATENT DOCUMENTS

| KR | 10-2004-0052397 | 6/2004 |
| KR | 10-2005-0079356 | 8/2005 |
| WO | WO 2011-104689  | 9/2011 |

OTHER PUBLICATIONS

Korean Intellectual Property Office, ISA, "International Search Report and Written Opinion" in PCT Application No. PCT/US2012/064219, dated Feb. 28, 2013, 8 pages.

*Primary Examiner* — Sun M Li
*Assistant Examiner* — Thuy N Nguyen
(74) *Attorney, Agent, or Firm* — Bookoff McAndrews, PLLC (57) ABSTRACT

A computerized enhanced discreet coupon (EDC) processing system processes shopper EDC(s) using a scanner and a processor. The scanner scans purchased items. The processor generates tickets corresponding to the purchased items, syntactically validates shopper EDC(s), semantically checks the EDC(s), and authenticates the EDC(s). If an EDC is authentic, then the processor compares the EDC against the ticket to determine if the EDC qualifies, and if so, then the EDC is redeemable. Authentication can be accomplished by, for example, comparing EDC rule(s) and/or rule identifier(s) against genuine rule/identifier sets. Genuine rule set includes a qualifying rule and a redemption rule.

23 Claims, 8 Drawing Sheets

(56) References Cited

U.S. PATENT DOCUMENTS

| | | | |
|---|---|---|---|
| 8,239,261 B2* | 8/2012 | Redford et al. | 705/14.22 |
| 8,533,045 B1* | 9/2013 | Cunningham et al. | 705/14.47 |
| 8,731,546 B2* | 5/2014 | Munje | G06F 17/30575 455/414.1 |
| 2004/0054590 A1* | 3/2004 | Redford et al. | 705/14 |
| 2004/0140361 A1* | 7/2004 | Paul | G06Q 20/341 235/462.45 |
| 2005/0114211 A1* | 5/2005 | Amjadi | 705/14 |
| 2005/0144074 A1* | 6/2005 | Fredregill et al. | 705/14 |
| 2008/0065490 A1* | 3/2008 | Novick et al. | 705/14 |
| 2009/0076912 A1* | 3/2009 | Rajan et al. | 705/14 |
| 2009/0254930 A1* | 10/2009 | Lo et al. | 725/2 |
| 2010/0122274 A1* | 5/2010 | Gillies et al. | 725/2 |
| 2012/0029998 A1* | 2/2012 | Aversano et al. | 705/14.27 |

* cited by examiner

Figure 1 – POS Enhanced Discrete Coupon (EDC) Processing System

Figure 3 – EDC Authoring Screen

Figure 4 – Enhanced Discrete Coupon Fields

Figure 5 – POS Process EDC(s)

Figure 7 – Check Semantics and Authenticate

Figure 8 – Verify Against Identified Purchase Item(s)

SYSTEMS AND METHODS FOR AUTOMATED AUTHORING, DISTRIBUTING AND PROCESSING OF ENHANCED DISCRETE COUPONS

CROSS REFERENCE TO RELATED APPLICATIONS

This application claims priority to U.S. Provisional Application Ser. No. 61/557,437 filed on Nov. 9, 2011, entitled "Coupon Definition System", which is incorporated by reference herein for all purposes.

BACKGROUND

The present invention generally relates to improving the discounting functionality and security of point-of-sale (POS) processing systems, and more particularly relates to authoring, distributing POS processing, and post-processing of substantially improved discount coupons.

Conventional legacy discount coupons have been standardized and in widespread use at many retail stores for many years. Legacy coupons include only two fields, a product category field and a discount type field, each field being 256-bits in length.

The very limited number of fields and limited field length necessitates the use of broad product categories and also results in a limited number of discount types. As a result, these legacy discount coupons are very inflexible and also very susceptible to fraud. For example, an unscrupulous shopper may attempt to present a "$5 discount" coupon, intended for an item retailing for $50, towards the purchase of a significantly lower priced item retailing for $3, assuming that the $3 item is in the same product category as the $50 item. If the sales associate at the point of sale (POS) is not alert and the number of items purchased by the shopper is large enough, then the shopper ends up with a $2 net cash credit towards the purchase of the other items ($3 item minus $5 discount). In other words, the shopper was rewarded a $2 cash credit for merely acquiring the $3 item at no cost.

Hence there is an urgent need for an improved automated POS system capable of processing a wider variety of discounts for a wider variety of products and product categories, while substantially decreasing fraud.

SUMMARY

To achieve the foregoing and in accordance with the present invention, systems and methods for authoring, distributing, point-of-sale (POS) processing, and post-processing of Enhanced Discrete Coupon(s) (EDC) are provided. In particular, the systems and methods provide a facility to enable and encourage shoppers to identify and seek out goods and/or services that may be acquired at special incentivizing prices, provided that for a given EDC, certain conditions set by the EDC issuer and encoded in the EDC are satisfied.

In one embodiment, a computerized enhanced discreet coupon (EDC) processing system is configured to process at least one enhanced discrete coupon (EDC) presented by a shopper. The EDC processing system includes a scanner and an EDC processor. The scanner is configured to scan one or more purchase items selected by a shopper. The EDC processor is configured to generate a ticket corresponding to the at least one purchase item, to syntactically validate at least one enhanced discrete coupon (EDC) presented by the shopper, to semantically check the at least one EDC, and to authenticate the at least one EDC. If the EDC is determined to be authentic, then the EDC processor compares the at least one EDC against the ticket to determine if the EDC qualifies, and if the EDC is both authentic and qualifies, then the EDC is permitted to be redeemed by the shopper.

In some embodiments, the EDC includes at least two EDC rule identifiers, and the authenticating includes comparing the at least two EDC rule identifiers with a plurality of genuine rule identifier sets associated with a corresponding plurality of genuine rule sets, wherein each genuine rule set includes a qualifying rule and a redemption rule. In another embodiment, the EDC includes an EDC rule set, and the authenticating includes comparing the EDC rule set with a plurality of genuine rule sets, wherein each genuine rule set includes a qualifying rule and a redemption rule. In yet another embodiment, the EDC includes an EDC rule and an EDC rule identifier, and the authenticating includes comparing the EDC rule and the EDC rule identifier with a plurality of genuine rule and rule identifier sets, wherein each genuine rule and rule identifier set includes a qualifying rule associated with a redemption rule identifier or a qualifying rule identifier associated with a redemption rule.

Depending on the implementation, the qualifying rules and the redemption rules can either be static or variable, and the EDC can include one or more rule operands associated with any variable rule(s). Qualifying and/or redemption rules can either be simple or compound.

The EDC can include one or more additional fields. Exemplary additional EDC field(s) may include inception date, duration, expiration date, and/or shopper identifier. The additional EDC field(s) can also be extendable.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

The present invention relates generally to systems and methods for authoring, distributing, point-of-sale (POS) processing, and post-processing of Enhanced Discrete Coupon(s) (EDC). In particular, the present invention—the Point-of-Sale Enhanced Discrete Coupon Processing System—is directed to novel methods and systems to provide goods manufacturers, service providers, goods and/or service sellers, and affiliated third party marketers ("EDC issuers") a facility to enable and encourage savings-motivated consumers ("shoppers") to become aware of and seek out goods and/or services that may be acquired at special incentivizing prices and to purchase said goods and/or services accordingly—provided that for a given EDC, certain conditions set by the EDC issuer and encoded in the EDC are satisfied. For example, an incentivizing price may be a discounted price for a specified purchase item, or for a specified group of purchase items, or for specified purchase item(s) conditioned on the purchase of certain other specified item(s).

Figure 1:
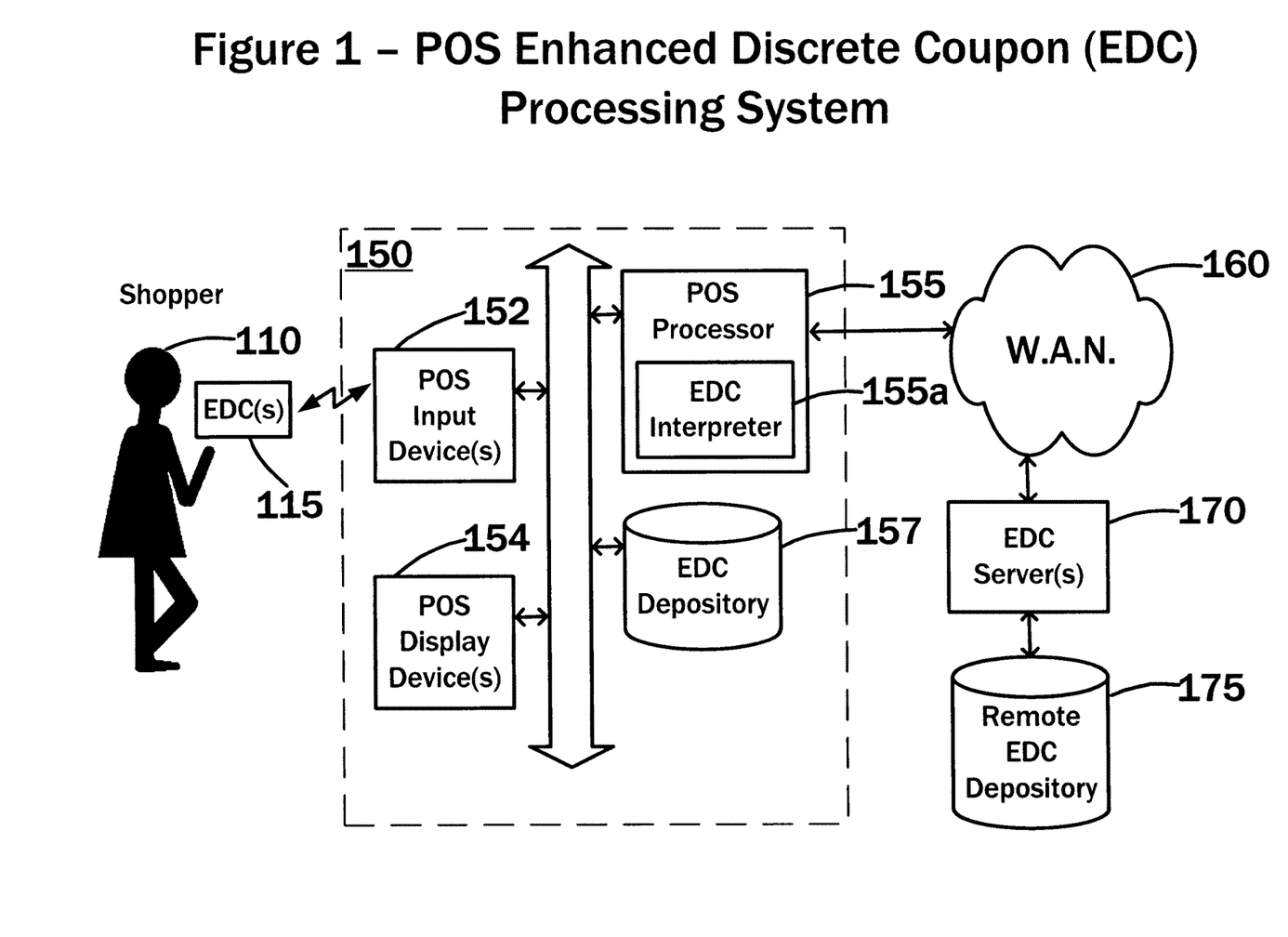
FIG. 1 is a System Level Block Diagram of a POS Enhanced Discrete Coupon (EDC) Processing System in accordance with an embodiment of the present invention.

To facilitate discussion, FIG. 1 shows an exemplary structural block diagram of the Point-of-Sale (POS) Enhanced Discrete Coupon (EDC) Processing System. Such a POS EDC Processing System 150 may include certain system components located at the point-of-sale such as POS Input Device(s) 152, POS Display Device(s) 154, POS Processor 155—which may include an EDC Interpreter 155a, and EDC Depository 157. A POS EDC Processing System 150 may be securely and reliably coupled via Wide Area Network 160 with EDC Server(s) 170 with Remote EDC Depository 175. EDC Server(s) 170 may be centrally located or distributed; and may potentially employ redundancy, mirroring and load-balancing, in addition to other techniques known to one skilled in the art, to increase the sustained and burst rate processing capacity and fault tolerance of EDC Server(s) 170. In some embodiments, one or more POS EDC Processing System(s) 150 may be coupled to a given EDC Server(s) 170.

In some embodiments, at the POS there may be one or more POS Input Device(s) 152 and one or more POS Display Device(s) 154 configured together with a POS Processor 155 including EDC Interpreter 155a, and an EDC Depository 157—composing an POS EDC Processing System 150—so as to allow shopper(s) 110 to have purchase items (not shown) scanned as well as EDC(s) 115 received, so as EDC(s) may be qualified, and if accepted, redeemed by said POS EDC Processing System 150. Said components of System 150 may interconnect in one or more combinations and/or configurations—e.g., utilizing cable(s), bus(es) and/or or local area network(s).

Utilizing the POS Input Device(s) 152 configured to scan purchase item(s)—each purchase item selected by shopper 110 may be scanned, identified, counted and priced by the POS Processor 155; and such information may be recorded so as to generate a corresponding quantified list, i.e., the "ticket". In addition, the ticket may record any discount(s) specified by redeemed EDC(s) as well as the net payment due from the shopper 110 to compensate the seller (not shown) for the purchase item(s). The ticket may also include the processing date of the ticket—the "POS transaction date". Furthermore, the ticket may include transaction details such as: identification of the seller, method of payment, and if available, information identifying the shopper 110. Information from the ticket may be used subsequently to compose receipt(s).

In addition to scanning purchase item(s), the POS Input Device(s) 152 may be utilized to receive EDC(s) 115 which the EDC Interpreter 155a may store in the EDC Depository 157. Additional information stored in the EDC Depository 157 may include ticket information and also entries recorded in a transaction log (not shown). Transaction log entries may record information from the POS processing of EDC(s) as well as information related to facilitating POS EDC processing. For example—subsequent to completing updates to the EDC Interpreter 155a—status, diagnostic and completion entries to the transaction log may be stored in the EDC Depository 157.

Figure 2:
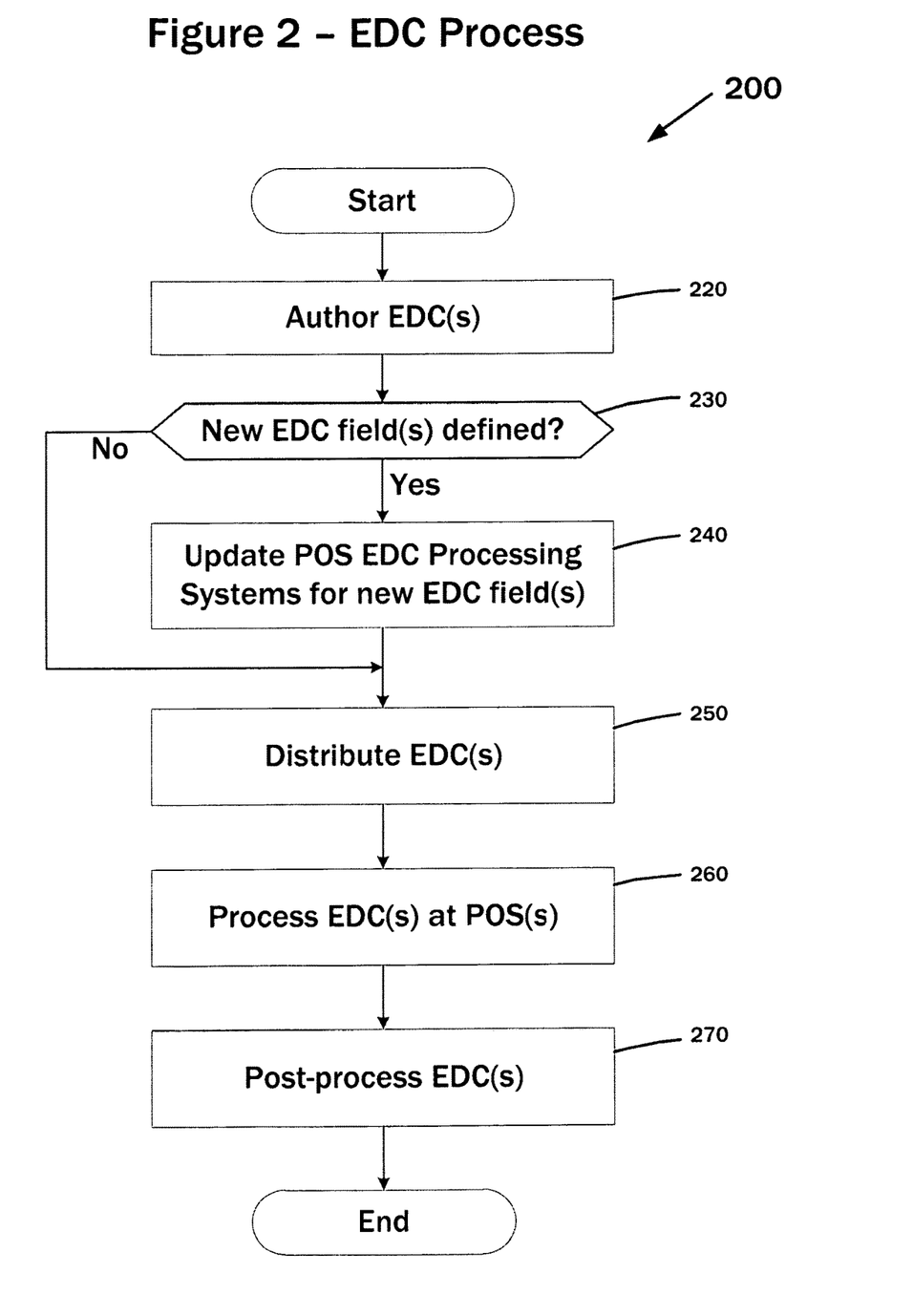
FIG. 2 is a Top Level Logic Flow Diagram in accordance with a POS EDC Processing System embodiment.

The POS EDC Processing System 150 may facilitate utilizations of EDC(s) by EDC issuers, by sellers, and by shoppers 110. In some embodiments—as illustrated in FIG. 2—the POS EDC Processing System 150 may support and/or utilize the following facilities: authoring of EDC(s), updating of POS EDC Processing Systems, distributing EDC(s), processing of EDC(s) at the POS, and post-processing of EDC(s).

Referring to step 220, EDC(s) 115 may be authored utilizing one or more devices (not shown) including, but not limited to, personal computers, laptop computers, tablet computers, "smart phones", and almost any electronic computing device that includes network access and a graphical user interface.

Figure 3:
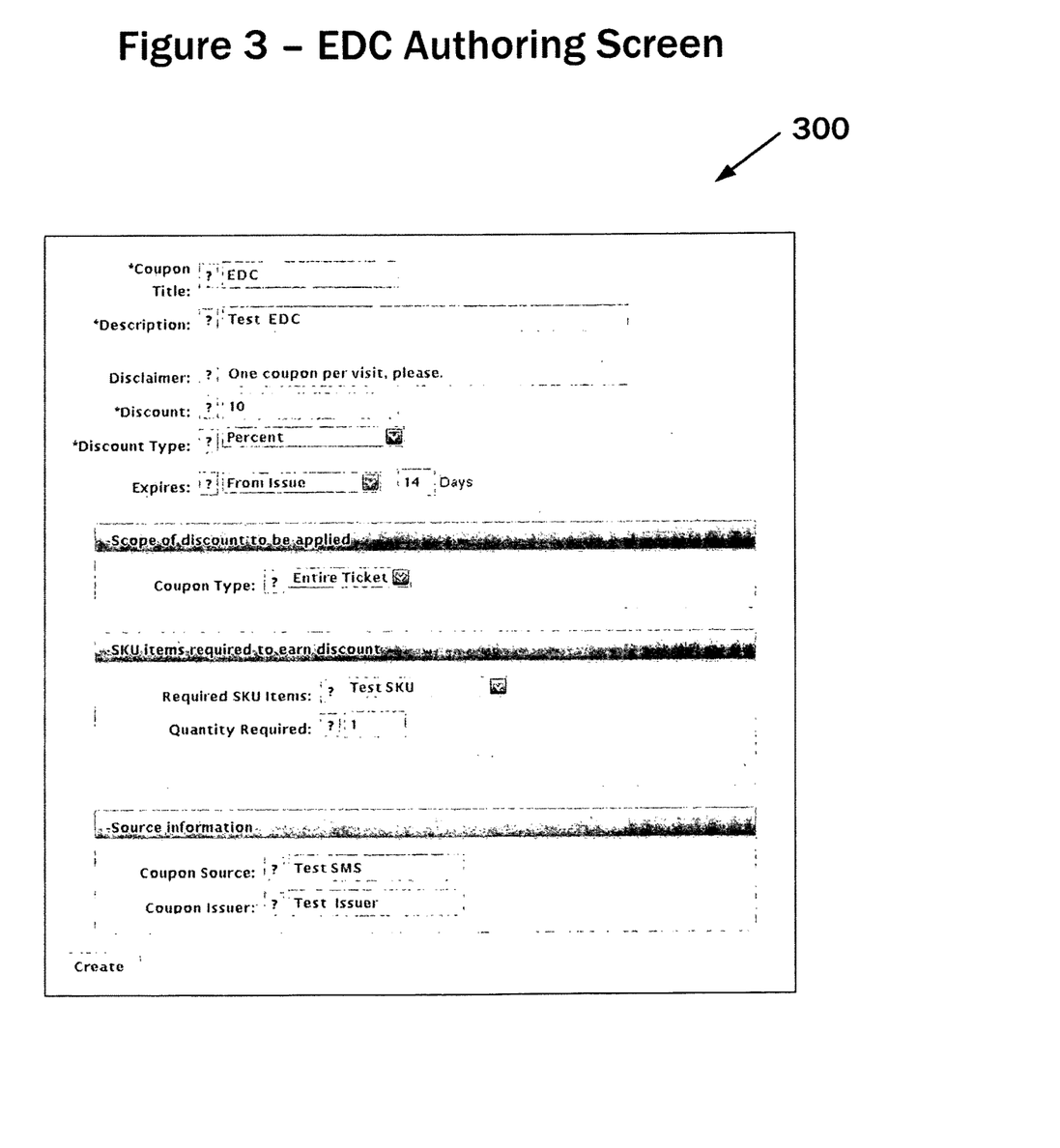
FIG. 3 is an exemplary screen shot of an EDC authoring facility in accordance with a POS EDC Processing System embodiment.

FIG. 3 shows an exemplary EDC authoring screenshot 300 for an EDC authoring facility (not shown) for authoring any given EDC 115.

Figure 4:
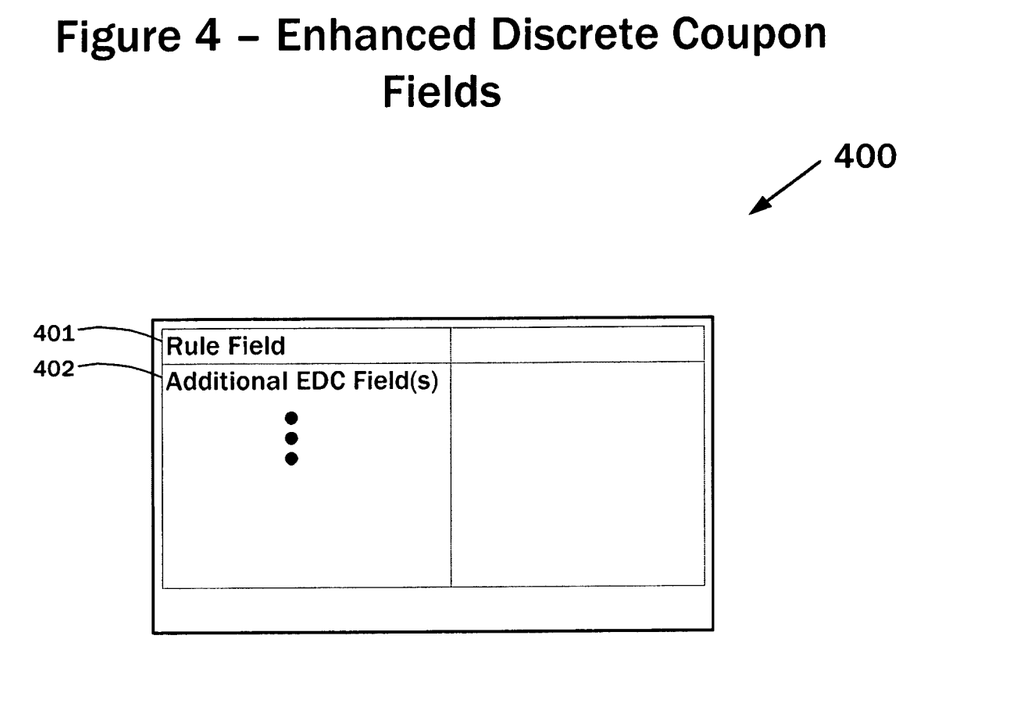
FIG. 4 is a Diagram of EDC fields in accordance with a POS EDC Processing System embodiment.

In some embodiments, referring to FIG. 4, a given utilization of an EDC authoring facility may result in authored EDC(s) stored in a Remote EDC Depository 175. An EDC 115 may include one or more fields—such as: EDC Rule Field 401 and optionally EDC Additional Field(s) 402. EDC Rule Field 401 includes EDC rule(s) and/or EDC rule identifier(s). An EDC rule may be a "qualification rule" and/or a "redemption rule".

A qualification rule specifies to the EDC Interpreter 155a action(s) required of the shopper 110 and detected at the POS by the System 150 so as an EDC 115—which includes said rule—qualifies for acceptance so as to be redeemed by the System 150. For example, a qualification rule may require that a specific quantity of a specific purchase item be selected by the shopper 110 and scanned by the System 150 and listed in the corresponding ticket—i.e., 'purchase quantity 4 of purchase item Mumby's Yumby Brand 32 oz Instant Chai Tea'.

A redemption rule specifies to the EDC Interpreter 155a action(s) required of the System 150 to redeem a received EDC 115. For example, a redemption rule may require that a discount be applied to a purchase item(s) identified in the ticket—i.e., 'discount an amount Y off purchase price of purchase item Z'. Further by example, a redemption rule may specify 'discount $1.14 off the purchase price of Kidd's Pruf Brand 16 oz Insulated Tea Mug'. Redemption rules may vary widely, but commonly they specify a credit(s)—such as a discount(s) and/or a rebate(s)—effecting a decrease(s) in the net payment recorded in the ticket and due of the shopper 110.

In some embodiments, an EDC rule may include more than one rule—typically with each rule combined with the other rule(s) using for example boolean operators(s) such as 'and' and/or 'or'—so as to form a "compound" rule. For example, a compound qualification rule may specify: 'purchase quantity 4 of purchase item Mumby's Yumby Brand 16 oz Vitalmineral H2Oh!—or—purchase quantity 2 of Kidd's Pruf Brand Flexzable Slurping Straws'. Similarly for example, a compound redemption rule may specify: 'discount $2.00 off of entire ticket—and—credit 200 points to shopper's loyalty account'. A common example of a compound qualifying rule is a requirement(s) for specified purchase item(s) and corresponding quantity(s) coupled with a rule specifying the EDC may be redeemed no later than a specific "expiration date". Some EDC(s) may include rules that do not specify an expiration date which in some embodiments may imply that the EDC may not expire. Some EDC(s) may include a rule and/or operand field that explicitly specifies: 'no expiration date'.

In some embodiments, an EDC rule may be a "variable" rule in that it includes a numerical amount or other specifier—such as where said specifier may be represented indirectly by a variable and further where the value corresponding to that variable is included in a separate corresponding "operand" field. So for example, a variable qualification rule may specify: 'purchase quantity [variable X] of Kidd's Pruf Brand 30 count Wunder Wypes' where the operand field specifying variable X may include the value '3'. Furthermore, a variable rule may utilize more than one operand fields; so for example, a variable redemption rule might specify: 'discount off entire ticket quantity [variable Y] of denomination [variable Z]' where the operand field specifying variable Y may include the value '5' and the operand field specifying variable Z may include the value 'dollars'. Such a variable rule would be the semantic equivalent of a "static" rule that specifies: 'discount off entire ticket quantity 5 of denomination dollars'.

Operand fields may be stored in the Additional EDC Field(s) 402 of an EDC. In some embodiments, the variable values corresponding to a variable rule may be included in an operand field or operand field(s) in the form of an n-tuple. For example, the variable redemption rule in the previous example may utilize a 2-tuple to specify the discount quantity and the corresponding discount denomination, i.e., '5': 'dollars'. An n-tuple may be stored in an EDC field or more than one EDC field(s). An example of a common 2-tuple is: a purchase item identifier—such as a stock-keeping unit code (SKU)—and corresponding item quantity. As mentioned previously, another 2-tuple may be: discount amount and corresponding discount denomination where the denomination might for example be 'dollars' or 'pesos' or 'percent' or 'loyalty points'. Another 2-tuple may be: an EDC inception date and corresponding duration which taken together may specify the expiration date of an EDC. To support complex rules that may be compound or variable or both, n-tuples may facilitate unlimited extensibility.

Additional EDC Field(s) 402 may include fields other than operand fields. For example, in some embodiments, Additional EDC Field(s) 402 may include one or more "error detection" field(s)—such as checksum(s)—to help detect corruption error(s) in a given EDC 115. Some error detection field(s) may support correcting corruption error(s) in addition to detecting them. Correction of corruption error(s) may also be facilitated by the symbology used to encode the EDC 115, for example Quick Response (QR) Code encoding may directly support corruption error correction.

The Additional EDC Field(s) 402 may include field(s) including human language—for example in the form of text—which may be displayed on a printed EDC 115 or otherwise displayed so that the shopper 110 or other person(s) may receive human language representation of the EDC 115. Such EDC field(s) may specify representations such as: title(s), descriptions(s), requirement(s), restriction(s) and disclaimer(s).

The Additional EDC Field(s) 402 may include field(s) that facilitate tracking the distribution and shopper utilization of EDC(s). For example, a "source" field may specify the method of distribution of the EDC 115 to the shopper 110. Furthermore, a "requestor" field may include shopper-identifying information such as a shopper's unique telephone number or a shopper's e-mail address. Additional EDC Field(s) 402 may include one or more "sequence number" field(s) that may facilitate identification(s) such as: identifying an EDC 115 distributed to one or more shopper(s) 110, uniquely identifying a given EDC 115 distributed to a given shopper 110, and/or identifying a specific shopper or shoppers to whom an EDC may be distributed.

Returning to FIG. 2 and referring further to step 230. In some embodiments, an EDC authoring facility may be utilized to define a new EDC field(s) and correspondingly author EDC(s) with such newly defined EDC field(s), which may necessitate updating EDC Interpreter(s) 155a to facilitate processing such newly defined EDC field(s). Such updates promptly disseminated may facilitate the seamless processing of EDC(s) 115 that include newly defined EDC field(s).

Referring to step 240, a POS EDC Processing System 150 may optionally be updated to utilize a revised version of the EDC Interpreter 155a. The EDC Interpreter 155a may be updated via the WAN 160; updates may include software and/or interpretable data—thereby realizing a significant cost benefit over physical upgrades utilizing hardware and/or firmware upgrades, and making updates less difficult.

Referring to FIG. 1, a POS EDC Processing System 150 may receive EDC(s) 115 which include newly defined EDC field(s) that the System 150 is unable to process. The POS Processor 155 may opt to query the EDC Server(s) 175 to determine if an updated version of the EDC Interpreter 155a may be available. If available, the POS Processor 155 may acquire a revised version of the EDC Interpreter 155a from the EDC Server(s) 175. the POS EDC Processing System 150 may be optionally updated at any time. Updates to the POS EDC Processing System 150 may be initiated by the System 150 (i.e., "pulled"). Updates to the POS EDC Processing System 150 may also be initiated remotely by the EDC Server 170 (i.e., "pushed"). The EDC Server 175 may offer update(s) to EDC Interpreter(s) 155a.

Referring to step 250, EDC(s) 115 may be distributed physically—printed on paper and distributed via mass circulation platforms such as direct mail, coupon books, magazines and newspapers, door hangers, and the backs of grocery market receipts. Additionally, EDC(s) 115 may be distributed electronically. For example, the image of a newly authored EDC 115 may be emailed to numerous shoppers 110; or the Internet location of an EDC 115 posted on-line may be communicated via SMS text messages or social media. EDCs 115 may be distributed by issuers, sellers, and a wide variety of third parties.

Figure 5:
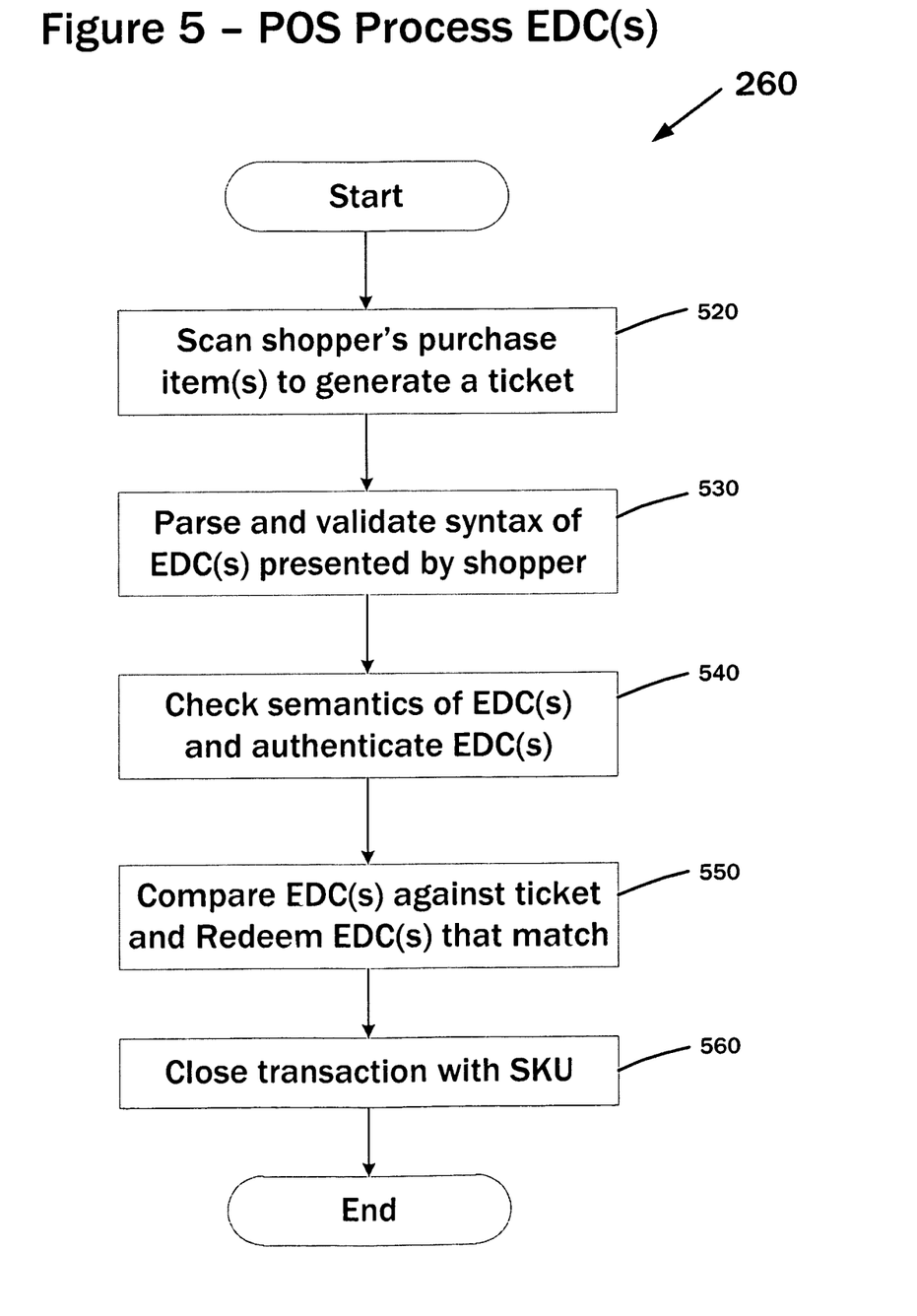
FIG. 5 is a Logic Flow Diagram that further decomposes Step 260 of FIG. 2 so as to describe the POS processing of EDC(s) in accordance with a POS EDC Processing System embodiment.

Referring to step 260, EDC(s) 115 presented at the POS by a shopper 110 are processed by the POS EDC Processing System 150 utilizing the EDC Interpreter 155a. FIG. 5 describes step 260 in greater detail by depicting some embodiments of the POS processing of EDC(s) 115.

At step 520, the POS Input Device(s) 152 may be configured and utilized to scan SKU(s) that identify purchase item(s) to the POS Processor 155. The POS Processor 155 may list such purchase item(s) in the ticket. Additionally, in some embodiments, shopper-identifying information may be read by POS Input Device(s) 152 from one or more sources including but not limited to a loyalty card, a credit or debit payment card, personal information such as a driver license number, a shopper-provided phone number, or possibly utilizing biometrics. Furthermore, in some embodiments, an EDC 115 may include Additional EDC Field(s) 402 that directly or indirectly identify the shopper 110. For example, an EDC 115 may include a unique sequence number assigned and recorded prior to, or at, the time the EDC 115 was distributed specifically to the shopper 110. The POS Processor 155 may record in the transaction log some or all shopper-identifying information—received at the POS and/or included in EDC(s) 115 presented by a given shopper 110—in association with the ticket listing that shopper's scanned purchase item(s).

Referring to step 530, the EDC Interpreter 155a parses an EDC 115 presented by a shopper 110 and received from the POS Input Device(s) 152. EDC(s) 115 may be presented by a shopper 110 in one of numerous forms, including but not limited to, wireless or printed. For example, an EDC may be presented in the form of a printed QR code.

Figure 6:
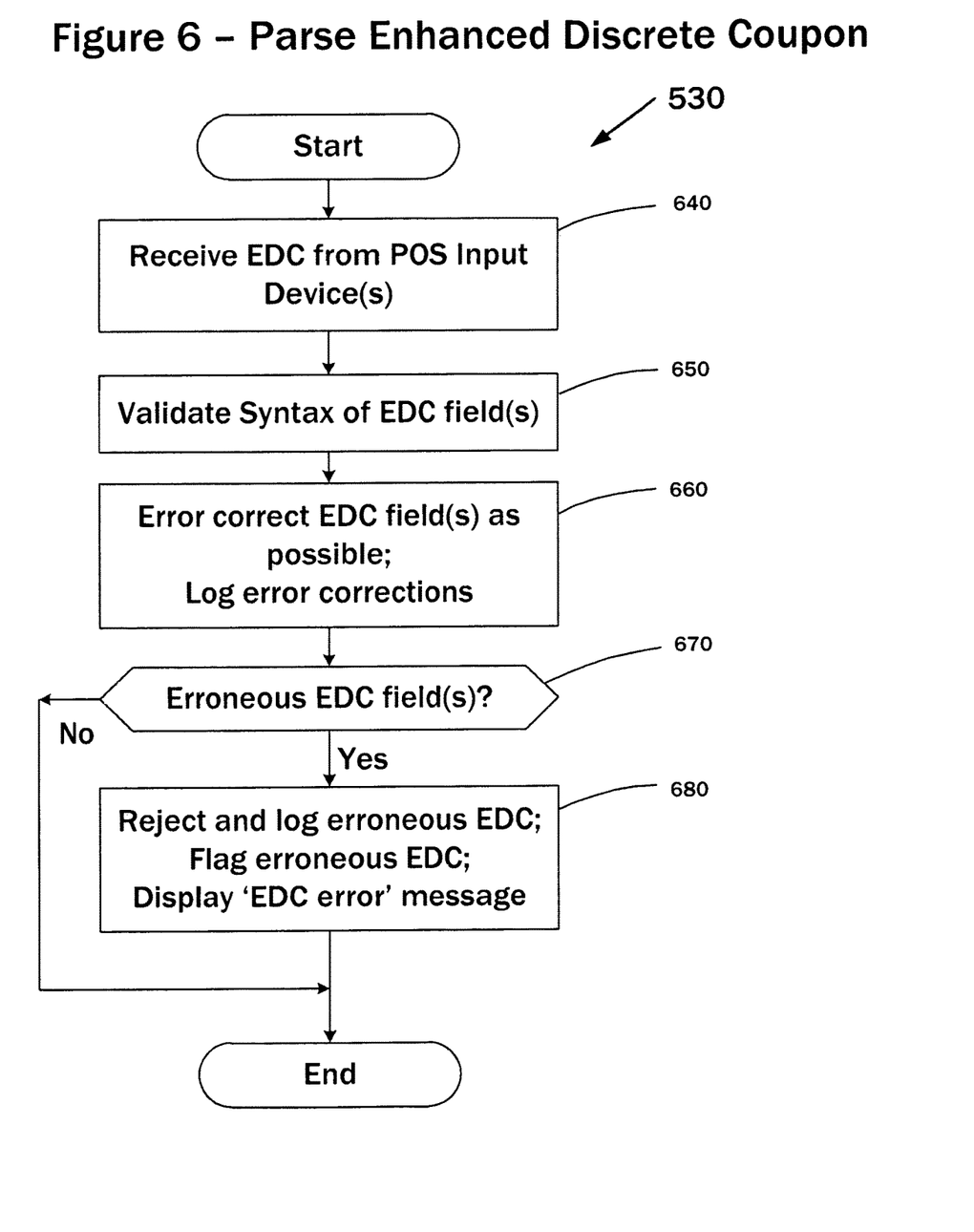
FIG. 6 is a Logic Flow Diagram that further decomposes Step 530 of FIG. 5 so as to describe the parsing and syntactical validation of an EDC in accordance with a POS EDC Processing System embodiment.

FIG. 6 describes step 530 in greater detail by depicting some embodiments of parsing an EDC 115 presented at the POS by the shopper 110. At step 640, the POS Processor 155 receives an EDC 115 from POS Input Device(s) 152.

At step 650, EDC error detection field(s) in the EDC Additional Fields 402 may be utilized by an EDC Interpreter 155a to validate that some or all of the field(s) included in an EDC 115 may be free of corruption errors. The EDC Interpreter 155a may validate EDC field(s) included in an EDC 115 utilizing structure and syntax rules for EDCs known to the EDC Interpreter 155a. The EDC Interpreter 155a may validate EDC field(s) included in an EDC 115 utilizing comparison against known-valid field values. A compound rule, for example may be validated by validating its component rules. A component rule, if specified by a rule identifier, can be validated simply by whether that identifier is known to the EDC Interpreter 155a. Similarly, numerous rules pre-analyzed and known to the EDC Interpreter 155a may be pre-cached so that a component rule may be compared against the pre-cached rules to see if there is a match. If a component rule is not known thusly to the EDC Interpreter 155a, the EDC Interpreter may optionally query the EDC Server(s) 170 for an update that may make said component rule known to the EDC Interpreter 155a. If said component rule is unknown to the EDC Interpreter 155a, the corresponding compound rule may be deemed to be invalid.

Referring to step 660—facilitated by error detection field(s) in the EDC Additional Fields 402—the EDC Interpreter 155a may detect and attempt to correct corruption errors in EDC field(s).

At Step 670, the EDC Interpreter 155a checks if EDC field(s) may be deemed to be erroneous. If EDC field(s) are deemed not to be erroneous, processing resumes at step 530 where the next received EDC 115—if any—may be processed.

Referring to step 680, given that EDC field(s) are deemed to be erroneous, the EDC Interpreter 155a rejects the erroneous EDC 115 and records the nature of the error(s) in the transaction log. The erroneous EDC 115 may be flagged accordingly to prevent further processing of that EDC 115. In some embodiments, an 'EDC error' message may be displayed via POS Display Device(s) 154. The next received EDC 115—if any—may be processed resuming at step 530.

Returning to FIG. 5 and referring to step 540, having parsed and syntactically validated the EDC field(s) at step 540 above, the EDC Interpreter 155a checks the semantics of the EDC 115 and authenticates the EDC as well.

Figure 7:
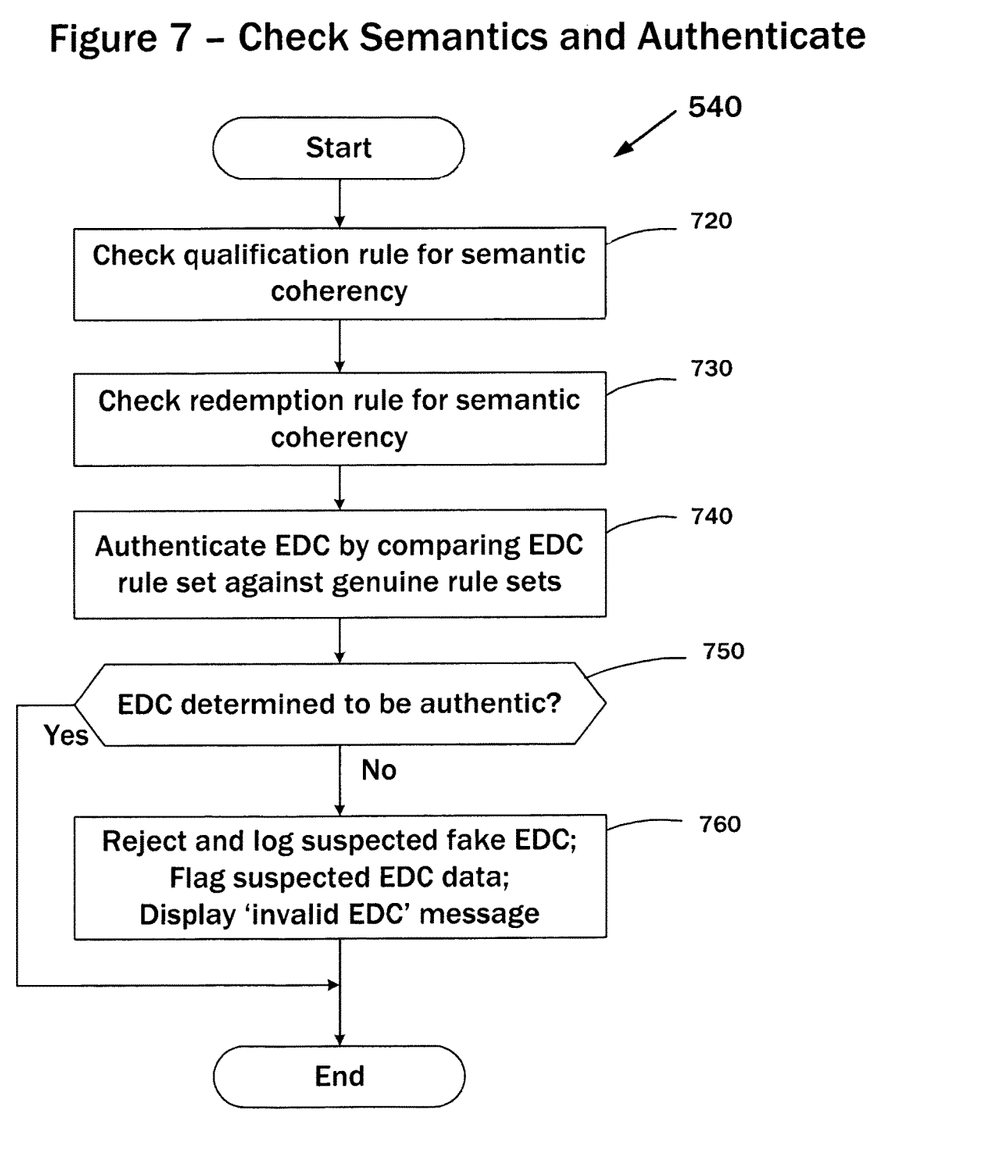
FIG. 7 is a Logic Flow Diagram that further decomposes Step 540 of FIG. 5 so as to describe the semantical checking and authentication of an EDC in accordance with a POS EDC Processing System embodiment.

FIG. 7 describes step 540 in greater detail by depicting some embodiments of semantically checking and authenticating an EDC 115.

Referring to step 720, the EDC Interpreter 155a checks the qualification rule for semantic coherency. Given that each of the one or more component rule(s) of the qualification rule is known to the Interpreter 155a—as syntactically validated at step 530—the EDC Interpreter checks whether combination of said component rule(s) may result in inconsistency. For example, a qualification rule may be composed of a static rule and a variable rule such that it specifies: 'quantity W of purchase item X—and—'quantity [Y] of purchase item X'—thus resulting in conflicting requirements for the quantity of purchase item X. Such inconsistency between component rules indicates to the Interpreter 155a that the qualification rule—which includes said inconsistent component rules—may therefore be semantically incoherent. If the qualification rule is a simple rule it is deemed consistent without checking for consistency.

Referring further to step 720, the EDC Interpreter 155a may apply "rule(s) of thumb" to check the sensibleness of the one or more component rule(s) of the qualification rule. For example, in some embodiments, rule of thumb "maximum sensible" quantity values for each purchase item may be stored and utilized by the EDC Interpreter 155a to check a component rule for sensibleness. For example, a qualification rule may be composed of a variable rule that specifies 'quantity [Z] of purchase item X' where Z is specified by a corresponding operand field included in the Additional EDC Field(s) 402. The value of Z may be specified as '6' which may be sensible if purchase item X is canned soup, but may be nonsensible if the purchase item is a frozen turkey. Nonsensibleness in a component rule indicates to the Interpreter 155a that the qualification rule is semantically incoherent.

Referring to step 730, the EDC Interpreter 155a similarly semantically checks the redemption rule by checking its one or more component rule(s) for consistency and sensibleness. The EDC authoring facilities may facilitate authoring EDCs that are semantically coherent. An EDC determined to be semantically incoherent may be determined therefore to be inauthentic.

Referring to step 740, the EDC Interpreter 155a the EDC Interpreter 155a authenticate(s) the received EDC by combining the qualification rule and the redemption rule as an "EDC rule set" and comparing said EDC rule set against a list of known genuine rule sets. In some embodiments, the EDC rule set may be formed using a rule identifier—corresponding to the qualification rule and/or the redemption rule—instead of the rule(s). So for example an EDC rule set may have one or more of the following forms: 'qualification rule: redemption rule'; 'qualification rule identifier: redemption rule'; 'qualification rule: redemption rule identifier'; or 'qualification rule identifier: redemption rule identifier'.

Referring further to step 740, if the EDC rule set matches an entry in the list of genuine rule sets, the EDC is determined to be authentic. In some embodiments, if the EDC rule set does not match a genuine rule set, the EDC Interpreter may request an update including genuine rule sets from the EDC Server(s) 170. If the EDC rule set does not match an entry in the list of genuine rule sets, the EDC is not authentic.

Referring to step 750, the EDC Interpreter 155a checks if the received EDC 115 is deemed authentic. If that EDC 115 is deemed authentic, processing resumes at step 550 where the next semantically validated EDC 115—if any—may be processed.

Otherwise, at step 760, the EDC 115 may be rejected; the EDC 115 may be flagged as suspect; the presumed fraudulent EDC may be recorded in the transaction log; and an exception message may be displayed on the POS Display Device(s) 154. The next semantically validated EDC 115—if any—may be processed resuming at step 550.

Returning to FIG. 5 and referring to step 550, the EDC Interpreter 155a compares the Received EDC(s) against the ticket and Redeems EDC(s) that match.

Figure 8:
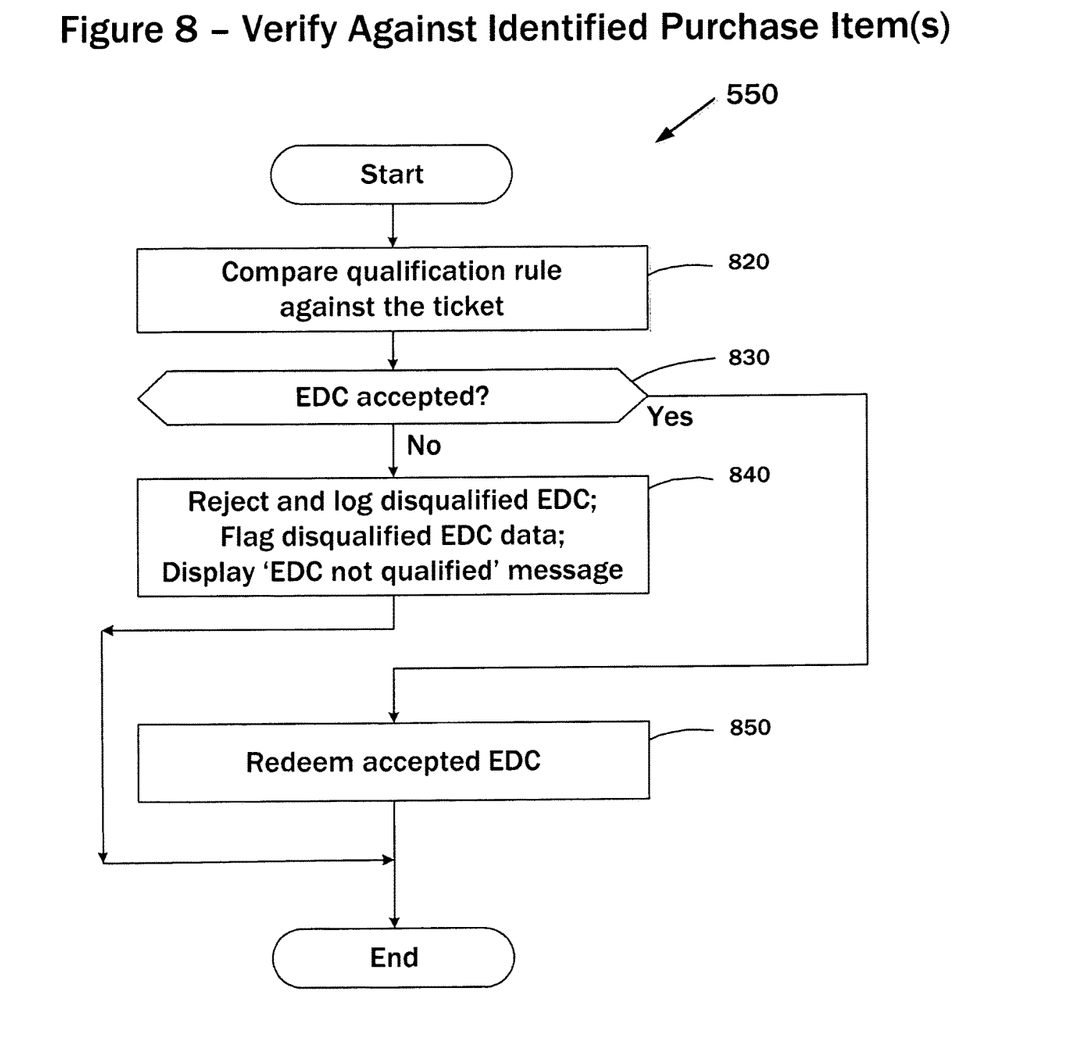
FIG. 8 is a Logic Flow Diagram that further decomposes Step 550 of FIG. 5 so as to describe the comparison of an EDC against the ticket and the redemption of an EDC in accordance with a POS EDC Processing System embodiment.

FIG. 8 describes step 550 in greater detail. Referring to step 820, the EDC Interpreter 155a compares the qualification rule set against the information recorded in the ticket—such as the listed purchase item(s) and corresponding quantity(s), and the POS transaction date.

Referring to step 830, the EDC Interpreter 155a checks if the qualification rule may be deemed satisfied. If so, processing continues at step 850.

Otherwise, referring to step 840, the unacceptable EDC is rejected; the EDC 115 is flagged as unacceptable; the EDC verification field set including the un-met condition(s) causing non-acceptance of the EDC 115 may be recorded in the transaction log; and an exception message may be displayed on the POS Display Device(s) 154. The next received and parsed EDC 115—if any—may be processed resuming at step 550.

At step 850, the redemption rules of the accepted EDC 115 may be applied to the ticket. Having accepted a given EDC 115 utilizing the POS EDC Processing System 150, the seller (not shown) honors the EDC specified discount out of seller's stock and/or proceeds and subsequently requests reimbursement from the EDC issuer (not shown) or a reimbursing third party based on accumulated EDC reimbursement totals stored in the EDC Depository 157. The next received and parsed EDC 115—if any—may be processed resuming at step 550.

Returning to FIG. 5 and referring to step 560, the EDC Interpreter 155a "closes the transaction with SKU"; i.e., the EDC Interpreter 155a records in the transaction log the ticket information including the details of each of the listed purchase item(s), as well as EDC(s) 115 verified against the ticket, as well as the final total discount. In some embodiments, shopper-identifying information—if available—is also logged. The logged transaction information may be subsequently communicated to the EDC Server 170 to facilitate post-processing.

Referring again to FIG. 2, at step 270, the POS Processor 155 periodically communicates transaction log information to the EDC Server 170 to facilitate post-processing. In post-processing, information including transaction log information may be analyzed to determine what seems to work successfully and what may be improved in a given EDC promotion campaign—specific to an individual shopper 110 and/or to shoppers in aggregate. For example, various methods of distribution may be compared to determine which have the highest EDC utilization rate. In some embodiments, post-processing may include identifying an individual shopper's purchase inclinations and providing that shopper with additional EDCs and other loyalty rewards, thus facilitating an ongoing loyaltizing cycle.

Many additions and modifications are possible. For example EDCs may be "personalizable". In some embodiments, shopper(s) 110 may access authoring facilities to author non-fraudulent "mix-and-match" EDC(s) that may include issuer-acceptable shopper-selected options and may be distributed to a given authoring shopper subject optionally to approval by the issuer; and furthermore such "mix-and-match" EDC(s) may be fully processed and accepted or rejected by POS EDC Processing System(s) 150. Optionally, such "mix-and-match" EDC(s) may be distributed to additional shopper(s) 110.

As well, in some embodiments, shopper(s) 110 may author or otherwise acquire non-fraudulent "bidding" EDC(s) that may include "bidding"-EDC-indicative encoding as well as "proposed" Discount Amount 403/Discount Type 402 values and optionally other "proposed" EDC field values; and furthermore such "bidding" EDC(s) may be recognizable as such and fully parsed, interpreted, validated, and accepted or rejected by POS EDC Processing System(s) 150—based in part on corresponding "bid-matching" verification field set(s) discrete from the "bidding" EDC 115 and accessed by EDC Interpreter 155a from EDC depository(s)—EDC Depository 157, Remote EDC Depository 175, and/or third party EDC depository.

Further pertaining to possible additions and modifications, EDC(s) may be "customizable". For example, in some embodiments, EDC issuers may utilize EDC authoring facilities to customize EDCs by directly defining new EDC fields. Furthermore, in some embodiments, Additional EDC Field(s) 402 may include customized EDC verification field sets whereby the issuer may define combinations of conventional and/or newly conceived EDC verification field sets. For example, EDC verification may be conditioned in part on: the shopper's identity, the day of the week, loyalty program membership, social network membership, and method of payment.

In some embodiments, a shopper 110 may utilize the POS EDC Processing System 150 to replace a misplaced or damaged EDC 115. For example, the ink on a printed EDC 115 may be smudged so badly that an EDC 115 may be unreadable by POS Input Device(s) 152. In some embodiments, the shopper may utilize POS Input Device(s) 152 to input shopper-identifying information—such as that described previously above—so as to obtain from the EDC Depository 157 or optionally from the Remote EDC Depository 175 the EDC 115 previously distributed specifically to that shopper 110. In some embodiments, the shopper 110 may use POS Input Device(s) 152 and POS Display Device(s) 154 to browse for and select the duplicate EDC 115 from EDC(s) stored in the EDC Depository 157 or optionally from the Remote EDC Depository 175. In some embodiments, the shopper 110 may use an EDC Display Device 154—such as a printer—to reproduce EDC 115.

In some embodiments, POS Display Device(s) 154 may be optional or may be integrated with POS Input Device(s). In some embodiments, a shopper's personal computing device—for example a "smart phone" may be utilized as a POS Input Device 152 and/or POS Display Device 154. In some embodiments, a shopper's personal computing device may be utilized as a POS Processor 155 and/or shopper-specific EDC depository 157.

In some embodiments, a newly authored EDC may be described in a Coupon Description Language (CDL). CDL may describe a given EDC field using a set of one or more descriptors such as: Field Title, Field Type, Field Location, Field Size, Field Human Language Description, and Field Value. For example, the EDC field EDC Discount Type 402, may be described in CDL, optionally including but not limited to the following CDL descriptors: Field Title= 'Discount Type Field'; Field Type='Discount Type'; Field Location='X bits offset'; Field Size='Y bits length'; Field Human Language Description='"Discount type—typically dollars or percentage"'. Additionally, referring to the same example, CDL may describe the value of the given Discount Type 402 field utilizing the CDL descriptor Field Value='Discount Denominated in Z'.

In some embodiments, CDL may be used to encode some updates to EDC Interpreter(s) 155*a*.

In some embodiments, CDL may be utilized as a common encoding utilized for communicating EDC(s) to and/or from third party servers.

In some embodiments, an EDC 115 may include EDC field(s) that include CDL. In some embodiments, a given EDC 115 may include some or all of the CDL generated by EDC authoring facilities describing said EDC 115. Such EDC(s) may be fully self-describing in CDL.

In some embodiments, the Additional EDC Fields 402 may encode a remote access reference such as a universal resource identifier (URI) that may be utilized to reference and access relatively large fields via WAN 160 from Remote EDC Depository 175 or optionally from EDC Depository 157. So, for example, a 500 word "boiler plate" disclaimer might be referenced indirectly by an EDC field rather than encoding that lengthy verbiage directly in the EDC 115.

In some embodiments, certain types of non-correctible errors detected in a given EDC may be compensated for or ignored. Such errors may be termed "non-critical errors". For example, an error in an EDC field including a human language title may be a non-critical error. In contrast, some non-correctible errors may ambiguate or prevent POS processing of a given EDC 115. For example, such a "critical error" may be a non-correctible error in an EDC's EDC Coupon Type 401. In some embodiments, the EDC Interpreter 155*a* may recognize non-critical non-correctible errors so as to ignore or compensate for them.

In some embodiments, error detection field(s) included in an EDC 115 may detect errors due to imperfect forgery. An EDC Interpreter 155*a* might analyze such errors and determine them to be the likely result of a forgery attempt. In this way, forgery attempts might not be misreported in the transaction log as data corruption errors.

In some embodiments, encryption may be used to enhance the security of an EDC 115 using strategies known to one versed in the arts including techniques such as watermarks and/or checksums.

In some embodiments, if a Received EDC is deemed inauthentic, a "potential fraud alert" may be communicated by the EDC Interpreter 155*a* to the EDC Server(s) 170 including information such as the ticket, the suspect EDC 115—and optionally—shopper-identifying information if available.

In some embodiments, a POS EDC Processing System 150 may include more than one EDC Processor 155—for example to facilitate fault tolerance and/or load balancing.

In some embodiments, a POS EDC Processing System 150 may include more than one EDC Depository 157—for example to facilitate fault tolerance and/or load balancing.

In some embodiments, the EDC Depository 157 may be located remotely from the POS and accessed over a WAN 160 so as to allow POS EDC Processing Systems 150 at multiple seller facilities to share the same EDC Depository 157.

In some embodiments, the EDC Interpreter 155*a* may be included in a processor other than the POS Processor 155 such that the EDC Interpreter 155*a* may be located remotely from the POS and accessed over a WAN 160 so as to allow POS EDC Processing Systems 150 at multiple seller facilities to share the same EDC Interpreter 155*a*.

In some embodiments, the Remote EDC Depository 175 may be fully distributed and included in EDC Depositories 157 so as to facilitate a "virtual" Remote EDC Depository 175. In some embodiments utilizing such a "virtual" Remote EDC Depository 175, the EDC Server(s) 170 may be optional.

In some embodiments, EDC authoring facilities may store authored EDC(s) in and/or distribute authored EDC(s) to EDC Depository(s) 157.

Advantages of the above described embodiments include but are not limited to: coupon fraud resistance; increased automation of coupon processing; ease of shopper use; ease of issuing more varied and flexible coupon offers; ease of adding new EDC fields; ease of updating EDC interpreters 155*a* and coordinating said updates with additions of new EDC fields; ease of transitioning to and leveraging of newer and higher density symbologies; ease of adapting to distribution methods—including physical and electronic.

In summary, Enhanced Discrete Coupons may be used to incentivize purchase of a nearly endless range of goods and services including "hard goods" such as consumer electronics and groceries, "soft goods" such as extended product warranties, and services such as home carpet cleaning. The use of a flexible yet authenticable EDC—combined with systems and methods that facilitate an adaptable POS Enhanced Discrete Coupon Processing System that may be updated for POS processing of new and/or revised EDC features with relative ease and seamlessness—makes for a highly adaptable system that may be extended, rather than superseded, for years to come.

What is claimed is:

1. A method for processing an enhanced discrete coupon (EDC) presented by a shopper, the method comprising:
    scanning, at a point of sale processor, at least one purchase item selected by a shopper;
    generating, by the point of sale processor, a ticket corresponding to the at least one purchase item;
    parsing, by an EDC interpreter installed in memory of the point of sale processor, an EDC that is provided wirelessly from a computing device of the shopper, the EDC interpreter being an executable software configuring the point of sale processor to process EDCs, the parsing comprising syntactically validating EDC rules encoded in the EDC based on one or more syntax rules,
    wherein the EDC is electronically issued to the computing device of the shopper based on user input provided by the shopper at an EDC authoring facility, the user input being provided via a user interface of the EDC authoring facility, and
    wherein the syntactically validating comprises comparing the EDC rules encoded in the EDC against known valid EDC rule values;

determining, by the point of sale processor, that the EDC rules encoded in the EDC comprise an EDC rule that is unknown to the EDC interpreter;

querying, by the point of sale processor, an external EDC server for an updated version of the EDC interpreter that is configured to process the EDC rule unknown to the EDC interpreter;

receiving, by the point of sale processor and from the external EDC server, the updated version of the EDC interpreter;

semantically checking, by the updated version of the EDC interpreter, the EDC rules encoded in the EDC for coherency, the semantically checking for coherency comprising:

comparing a maximum sensible quantity for one of a plurality of purchase items to at least one EDC rule of the EDC rules encoded in the EDC, wherein the at least one EDC rule is a qualification rule specifying a quantity, if the specified quantity exceeds the maximum sensible quantity, identifying the EDC as semantically incoherent and inauthentic, and if the specified quantity does not exceed the maximum sensible quantity, identifying the EDC as semantically coherent;

in response to identifying the EDC as semantically coherent, authenticating, by the updated version of the EDC interpreter, the EDC based on a comparison of the EDC rules encoded in the EDC against a set of known genuine rules; and if the EDC is authentic, comparing the EDC against the ticket to determine if the EDC qualifies, and if the EDC is authentic and qualifies, then redeeming the EDC.

2. The method of claim 1, wherein the EDC rules encoded in the EDC comprise at least two EDC rule identifiers indicative of the rules; and wherein the authenticating comprises comparing the at least two EDC rule identifiers with a plurality of genuine rule identifier sets associated with a corresponding plurality of genuine rule sets, wherein the at least two EDC rule identifiers are indicative of a qualification rule and a redemption rule, and if the at least two EDC rule identifiers are one of the genuine rule identifier sets, then authenticating the EDC.

3. The method of claim 1, wherein the EDC rules encoded in the EDC comprise an EDC rule set identifier indicative of the rules; and wherein the authenticating comprises comparing the EDC rule set identifier with a plurality of genuine rule set identifiers associated with a corresponding plurality of genuine rule sets, wherein the EDC rule set identifier is indicative of a qualification rule and a redemption rule, and if the EDC rule set identifier is one of the genuine rule set identifiers, then authenticating the EDC.

4. The method of claim 1, further comprising:

combining, by the updated version of the EDC interpreter, the EDC rules encoded in the EDC to generate an EDC rule set; and wherein the authenticating comprises comparing the EDC rule set with a plurality of genuine rule sets, wherein each EDC rule set comprises a qualification rule and a redemption rule, and if the EDC rule set is one of the genuine rule sets, then authenticating the EDC.

5. The method of claim 1, wherein one of the EDC rules encoded in the EDC comprises an EDC rule identifier indicative of the EDC rule; and wherein the authenticating includes comparing the EDC rule and the EDC rule identifier with a plurality of genuine rule and rule identifier sets, wherein each EDC rule and EDC rule identifier set comprises a qualification rule associated with a redemption rule identifier or a qualification rule identifier associated with a redemption rule, and if the EDC rule encoded in the EDC and the EDC rule identifier is one of the genuine rule and rule identifier sets, then authenticating the EDC.

6. The method of claim 2, wherein at least one of the qualification rule and the redemption rule is a variable rule, and wherein the EDC further comprises a rule operand field associated with the variable rule.

7. The method of claim 3, wherein at least one of the qualification rule and the redemption rule is a variable rule, and wherein the EDC comprises a rule operand field associated with the variable rule.

8. The method of claim 4, wherein at least one of the qualification rule and the redemption rule is a variable rule, and wherein the EDC comprises a rule operand field associated with the variable rule.

9. The method of claim 2, wherein at least one of the qualification rule and the redemption rule is a compound rule.

10. The method of claim 3, wherein at least one of the qualification rule and the redemption rule is a compound rule.

11. The method of claim 4, wherein at least one of the qualification rule and the redemption rule is a compound rule.

12. The method of claim 6, wherein the semantically checking for coherency comprises comparing the variable rule with a rule of thumb.

13. The method of claim 7, wherein the semantically checking for coherency comprises comparing the variable rule with a rule of thumb.

14. The method of claim 8, wherein the semantically checking for coherency comprises comparing the variable rule with a rule of thumb.

15. The method of claim 1, wherein the EDC comprises at least one additional field.

16. The method of claim 15, wherein the at least one additional field comprises at least one of an inception date, a duration, an expiration date, and a shopper identifier.

17. The method of claim 15, wherein the at least one additional field is extendable.

18. The method of claim 15, further comprising decrypting the EDC.

19. The method of claim 1, further comprising loyaltizing the shopper.

20. A system configured to process an enhanced discreet coupon (EDC) presented by a shopper, the system comprising:

an EDC server;

an EDC authoring facility comprising a processor to:
receive user input from a shopper via a user interface; and
electronically issue an EDC to a computing device of the shopper based on the user input;

a point of sale (POS) EDC processing system comprising:
a scanner to scan at least one purchase item selected by a shopper;
a point of sale processor to generate a ticket corresponding to the at least one purchase item; and
an EDC interpreter installed in memory of the point of sale processor, the EDC interpreter being an executable software configuring the point of sale processor to process EDCs;

wherein the point of sale processor is configured to:
parse, by the EDC interpreter, the EDC that is provided wirelessly from the computing device of the shopper, the parsing comprising:
syntactically validating EDC rules encoded in the EDC based on one or more syntax rules,
wherein the syntactically validating comprises comparing the EDC rules encoded in the EDC against known valid EDC rule values;
determine that the EDC rules encoded in the EDC comprise an EDC rule that is unknown to the EDC interpreter;
query the EDC server for an updated version of the EDC interpreter that is configured to process the EDC rule unknown to the EDC interpreter;
receive the updated version of the EDC interpreter from the EDC server;
semantically check, by the updated version of the EDC interpreter, the EDC rules encoded in the EDC for coherency, the semantically checking for coherency comprising:
comparing a maximum sensible quantity for one of a plurality of purchase items to at least one EDC rule of the EDC rules encoded in the EDC, wherein the at least one EDC rule is a qualification rule specifying a quantity,
if the specified quantity exceeds the maximum sensible quantity, identifying the EDC as semantically incoherent and inauthentic, and
if the specified quantity does not exceed the maximum sensible quantity, identifying the EDC as semantically coherent;
in response to identifying the EDC as semantically coherent, authenticate, by the updated version of the EDC interpreter, the EDC based on a comparison of the EDC rules encoded in the EDC against a set of known genuine rules; and
if the EDC is authentic, compare the EDC against the ticket to determine if the EDC qualifies, and if the EDC is authentic and qualifies, then redeem the EDC.

21. A method for authenticating an enhanced discrete coupon (EDC) presented by a shopper, the method comprising:
scanning, at a point of sale processor, at least one purchase item selected by a shopper;
generating, by the point of sale processor, a ticket corresponding to the at least one purchase item;
receiving, by an EDC interpreter installed in memory of the point of sale processor, an EDC from a computing device of the shopper wirelessly, the EDC interpreter being an executable software configuring the point of sale processor to process EDCs, and wherein the EDC is electronically issued to the computing device of the shopper based on user input provided by the shopper at an EDC authoring facility, the user input being provided via a user interface of the EDC authoring facility;
parsing, by the EDC interpreter, the EDC by:
syntactically validating EDC rules encoded in the EDC based on one or more syntax rules,
wherein the syntactically validating comprises comparing the EDC rules encoded in the EDC against known valid EDC rule values;
determining, by the point of sale processor, that the EDC rules encoded in the EDC comprise an EDC rule that is unknown to the EDC interpreter;
querying, by the point of sale processor, an external EDC server for an updated version of the EDC interpreter that is configured to process the EDC rule unknown to the EDC interpreter;
receiving, by the point of sale processor and from the external EDC server, the updated version of the EDC interpreter;
semantically checking, by the updated version of the EDC interpreter, the EDC rules encoded in the EDC for coherency, the semantically checking for coherency comprising:
comparing a maximum sensible quantity for one of a plurality of purchase items to at least one EDC rule of the EDC rules encoded in the EDC, wherein the at least one EDC rule is a qualification rule specifying a quantity,
if the specified quantity exceeds the maximum sensible quantity, identifying the EDC as semantically incoherent and inauthentic, and
if the specified quantity does not exceed the maximum sensible quantity, identifying the EDC as semantically coherent;
in response to identifying the EDC as semantically coherent, authenticating, by the updated version of the EDC interpreter, the EDC based on a comparison of at least two EDC rule identifiers with a plurality of genuine rule identifier sets associated with a corresponding plurality of genuine rule sets, wherein the at least two EDC rule identifiers are indicative of a qualification rule and a redemption rule, and wherein the EDC rules encoded in the EDC comprise at least the two EDC rule identifiers;
if the at least two EDC rule identifiers are one of the genuine rule identifier sets, notifying the point of sale processor that the EDC is authentic;
determining whether the EDC qualifies to be redeemed by comparing, by the point of sale processor, the EDC against the ticket; and
in response to determining that the EDC qualifies to be redeemed, redeeming the EDC.

22. The method of claim 21, wherein at least one of the qualification rule and the redemption rule indicated in the at least two EDC rule identifiers is a variable rule, and wherein the EDC comprises a rule operand field associated with the variable rule.

23. The method of claim 21, wherein at least one of the qualification rule and the redemption rule indicated in the at least two EDC rule identifiers is a compound rule.

* * * * *